April 8, 1930.  F. P. LARSON ET AL  1,753,895
STEAMER
Filed Aug. 11, 1928
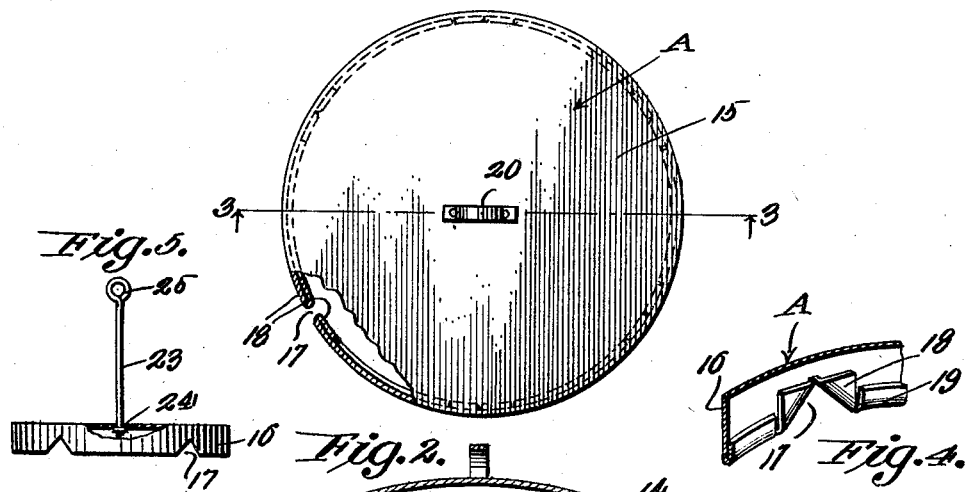
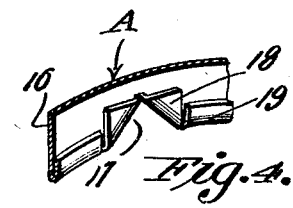
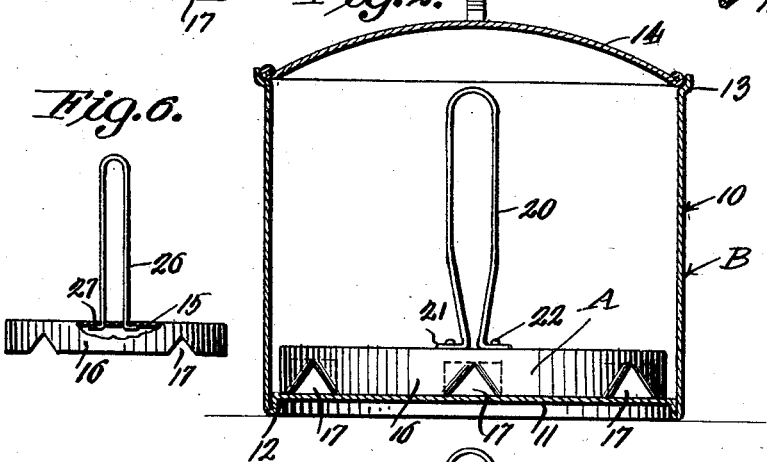
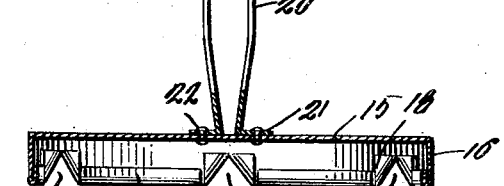
WITNESSES
INVENTOR.
FRED P. LARSON
FLORENCE L. LARSON
BY
ATTORNEYS.

Patented Apr. 8, 1930

1,753,895

UNITED STATES PATENT OFFICE

FRED P. LARSON AND FLORENCE T. LARSON, OF LUDINGTON, MICHIGAN

STEAMER

Application filed August 11, 1928. Serial No. 299,032.

This invention relates to cooking utensils and more particularly to a device for cooking food by steam or by its own juices.

One of the primary objects of this invention is to provide a novel device for cooking food stuffs by steaming or by the juices contained in the food, which embodies a novel plate or false bottom for the cooking utensil with means so arranged as to allow the free passage of steam around said plate or false bottom to the food, the arrangement being such that the food is permitted to retain all of its flavor and to be cooked without becoming discolored.

Another salient feature of the invention is the provision of an attachment which can be used with an ordinary cooking utensil for changing such utensil into a steamer, said attachment being of a simple and durable character which can be manufactured and placed upon the market at a very low cost.

A further important object of the invention is the provision of an attachment for cooking vessels embodying a body portion shaped to fit within said vessel having a depending flange with novel turned in portions which function to reinforce the flange and body and to also form steam escape openings to permit the ready cooking of the food stuffs.

A still further object of the invention is the provision of a novel handle for connection with said body portion whereby the attachment and the food placed thereon can be readily removed from the cooking utensil.

With these and other objects in view, the invention consists in the novel construction, arrangement and formation of parts, as will be hereinafter more specifically described, claimed and illustrated in the accompanying drawing, in which drawing:—

Figure 1 is a top plan view of the improved attachment, showing parts thereof broken away and in section.

Figure 2 is a diametric section through a cooking vessel showing the improved attachment placed therein, the attachment being shown in side elevation.

Figure 3 is a diametric section through the attachment taken on the line 3—3 of Figure 1 looking in the direction of the arrows.

Figure 4 is a detail fragmentary perspective view showing a portion of the flange of the body portion of the attachment illustrating the novel formation thereof.

Figure 5 is a side elevation of a slightly modified form of the attachment, parts thereof being broken away and in section, and Figure 6 is a similar view showing a still further modified form of the attachment.

Referring now to the drawing in detail, wherein similar reference characters designate corresponding parts throughout the several views, the letter A generally indicates the improved attachment and B a cooking vessel with which the same can be used.

The attachment A can be either placed upon the market by itself to be used in connection with ordinary cooking vessels on the market or can be sold in combination with a cooking vessel made for its particular purpose.

As shown in the drawing, the cooking vessel B comprises a cylindrical side wall 10 having an integral bottom wall 11, which is preferably spaced from the lower edge of the side wall by the use of a suitable bead 12. The upper end of the side wall 10 can be flared outwardly as at 13 to form a seat for a cover 14.

The improved attachment A can be made of sheet metal of the desired gage and embodies a body portion or plate 15 having formed on its marginal edge a depending spacing flange 16. This flange at spaced points can be provided with inverted V-shaped notches 17 to permit the passage of steam from under the plate 15 around the side of the flange 16. We prefer to make the V-shaped notches 17 in the flange 16 by splitting the flange vertically at spaced points and then folding portions of the metal on each side of split backward on a diagonal line which forms triangular shaped reinforcing wings 18 for the flange. Also by providing the bent back triangular shaped wings 18 eliminates the formation of sharp cutting edges. The lower edge of the flange between the notches 17 is also rolled or bent back as at 19 to provide reinforcing members and to also eliminate the formation of sharp edges.

Any desired type of manipulating handle can be provided for the attachment and as shown in Figures 1 to 3 inclusive I prefer to provide a single strip of metal bent to form a substantially U-shaped bail 20, the lower ends of which can be slightly converged and provided with attaching feet 21. These feet can be riveted as at 22 or otherwise secured to the upper face of the disc or plate 15.

In Figures 5 and 6 of the drawing I have merely shown the flange 16 provided with V-shaped notches and in which instance the metal can be entirely cut away to provide said notches.

As also shown in Figure 5 of the drawing I can provide a handle formed from a length of wire or metal rod of the desired gage and in this instance the lower end of the rod 23 is inserted through an opening in the center of the plate 15 and a nut 24 can be utilized for holding the rod in position. The upper end of the rod 23 can be curved to provide a manipulating handle or eye 25.

In Figure 6 of the drawing I have shown a still further modified form of handle which can also be constructed of wire and in this instance the wire is bent to form a substantially inverted U-shaped bail 26, the ends of which can be inserted through openings in the plate 15 and then bent laterally to provide retaining feet or fastening members 27 which can be secured in any way such as by the use of solder, spot welding or the like.

In use of the improved device the attachment is placed directly within the vessel B and a small quantity of water can be placed in the vessel if preferred. The water, however, should not extend above the V-shaped notches and the food to be cooked is placed directly upon the plate or disc 15 after which the cover 14 is placed on the vessel and the cooking process is then proceeded with.

The steam generated will be collected under the plate 15 and will flow through the notches 17 and up into the body portion of the vessel around the food being cooked.

By actual experiment the applicants have found that the food will not burn and the original flavor of the food will be retained as well as the color thereof.

Changes in details may be made without departing from the spirit or the scope of the invention, but

What we claim as new is:

A steam cooking appliance comprising a top plate, a depending spacing flange formed on the marginal edge of said plate, the flange having bent-back triangular shaped wings at spaced points defining V shaped steam escape notches, the portions between said notches being folded back to provide reinforcing means, and a handle connected with said top plate, the bent-back portions of the flange and said wings being in facial abutment with the body portion of the flange.

In testimony whereof we affix our signatures.

FRED P. LARSON.
FLORENCE T. LARSON.